Oct. 18, 1927.
T. K. STEVENSON
1,645,669
GEAR WHEEL HOLDER
Filed Jan. 4, 1927
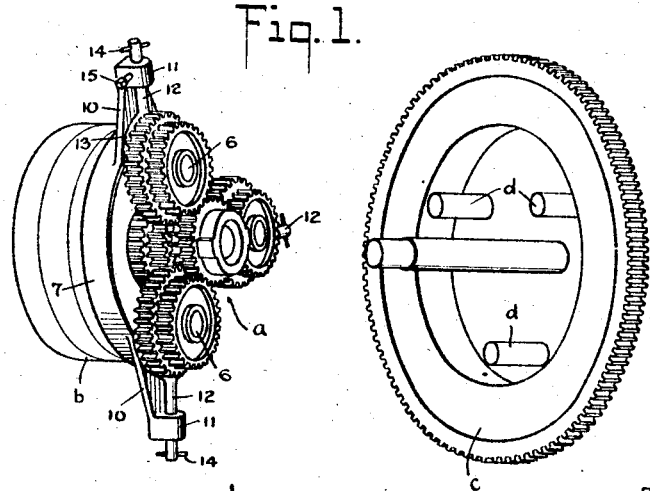
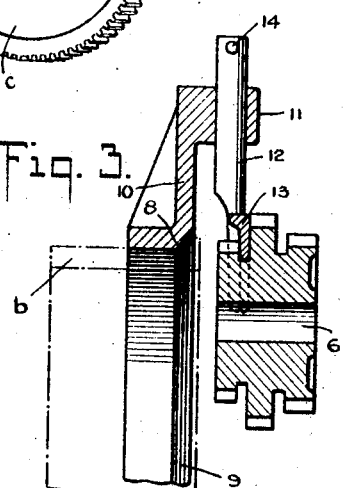
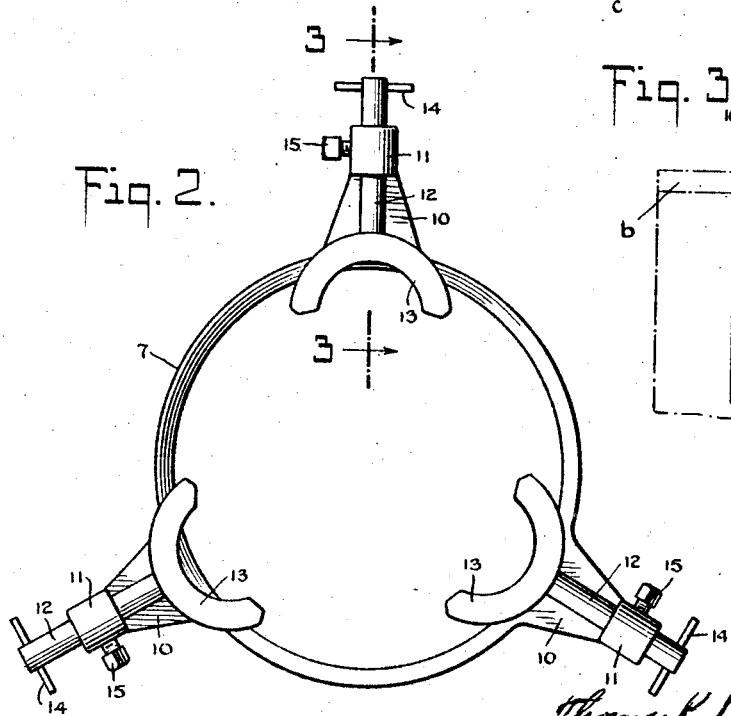
INVENTOR
Thomas K Stevenson
BY
Cavanagh & James
ATTORNEYS Patented Oct. 18, 1927.

1,645,669

UNITED STATES PATENT OFFICE.

THOMAS K. STEVENSON, OF NEW YORK, N. Y., ASSIGNOR TO FRANCIS VAN BLARCOM, OF NEW YORK, N. Y.

GEAR-WHEEL HOLDER.

Application filed January 4, 1927. Serial No. 158,865.

The present invention relates generally to tools adapted for use in the operation of restoring machine parts, to the positions which the parts previously occupied in a machine, and also for setting new parts within a machine.

The invention has particular reference to tools adapted for use with motor vehicles and in connection with the operation of resetting the gear wheels of a type of selective speed transmission found in motor vehicles.

In any motor vehicle where the type of selective speed transmission employed includes among other elements a part having a centrally disposed driven gear made up of a plurality of integrally connected super-posed spur gears of various sizes meshing with a plurality of similarly formed spur gear units, and another part carrying the pins upon which all of said gear wheels rotate, considerable time and labor has heretofore been required in effecting replacement of the gear wheels upon the pins after the parts were taken down for purposes of inspection or repair. Evidence as to the truth of the foregoing statement is to be found in connection with the operation of reassembling the several triple gears included in the transmission of a Ford motor vehicle, where the gears are constructed and mounted substantially as stated above.

Coming now to the present invention the general object thereof is to facilitate and simplify the operation of arranging, in required spaced relation, a plurality of units, each comprising a plurality of integrally connected super-posed spur gears of different sizes around the periphery of a centrally disposed and similarly constructed spur gear wheel unit.

The above and other objects are accomplished by instrumentalities pointed out in the following specification.

The invention is defined in the claims.

A satisfactory embodiment of the invention is illustrated in the accompanying drawings forming part of the specifications and in which Fig. 1 is a perspective of the parts of a type of motor vehicle transmission in separated relation and showing the device of this invention in use;

Fig. 2 is a detail plan of the invention on a slightly larger scale than shown in Fig. 1; and Fig. 3 is a cross sectional detail on the line 3—3 of Fig. 2.

In the drawings $a$ indicates generally the gearing, $b$ the transmission drums, and $c$ a part carrying the pins $d$ for the gearing $a$, of a type of selective speed transmission now used in motor vehicle construction. Fig. 1 shows the parts $a$ and $b$ separated from parts $c$ and $d$, and further shows the approximate positions which the several parts must occupy relatively to each other in order to be connected operatively. When the several parts are operatively connected the hubs 6 fit over pins $d$.

Referring now to Figs. 2 and 3, the present invention comprises a circular metallic band or body portion 7 which is adapted to be passed over transmission drums $b$ from the left in Fig. 1 and adjusted about the end of said drums on the right of the said Fig. 1. When the band is so adjusted a bevelled edge 8 thereof abuts a correspondingly bevelled edge 9 on the adjacent drum which limits the movement of the band upon the drums, all of which is shown in Fig. 3. Band 7 is provided with a plurality of radially disposed bracket arms 10 spaced apart for angular distances corresponding to the spacing between pins $d$ and each arm terminates in a right angularly disposed guide or sleeve 11. The shanks 12 of a plurality of carriers are slidably fitted in sleeves 11 and the inner ends of the shanks are provided with crescent shaped yokes 13 which are disposed beyond the adjacent side edge of the band 7. The lengths of shanks 12 are such as to provide for projecting the yokes 13 inwardly beyond the inner side of band 7 when the shanks are moved inwardly by manipulating the cross bars 14 at the outer end portions of the shanks. Set screws 15 are provided for securing the shanks in any of their adjusted positions.

In the use of the device and after the band has been adjusted upon the drum on the right of Fig. 1, as previously described, the shanks 12 are moved outwardly and the yokes 13 thereby retracted approximately to the positions shown in Fig. 2. The central unit of the gearing is then arranged centrally upon the adjacent end wall of the drum after which the outer or peripherally disposed units of the gearing are engaged with the yokes 13. Referring to Fig. 3, it is to be noted that the yoke 13 there shown, engages the gear unit by fitting into a segment of the inner circular groove of the unit, and in like manner each of the peripherally disposed gear wheel units is engaged by its respective yoke. When the yokes are retracted as previously stated, sufficient clearance is provided between the yokes and the central gear unit to avoid interference on the part of the central gear in engaging the outer gear wheels with the yokes. When the several outer gear wheel units are supported, as shown in connection with the unit in Fig. 1, shanks 12 are caused to slide inwardly until the teeth of the outer or peripheral gears mesh with the teeth of the central gear, whereupon the parts occupy the positions shown on the right of Fig. 1. When set screws 15 are turned into binding contact with shanks 12 the several gear wheels are positively held against lateral displacement and may be readily slipped over their respective pins $d$; after which the device may be detached from the transmission by causing the yokes to move outwardly and withdrawing the band 7 from the transmission drums $d$.

Although I have shown and described one embodiment of my invention, it is to be understood that the same is susceptible of various changes; and I reserve the right to employ such of these as may come within the scope of the appended claims.

What I claim is:

1. A gear wheel holder comprising a band adapted to be disposed concentrically of a spur gear wheel and a plurality of carriers extending radially outward from the band and slidably connected thereto, said carriers adapted for supporting a plurality of spur gear wheels by engaging therewith, and further adapted for moving the gear wheels radially inward and into engagement with the gear wheel disposed centrally of the band.

2. A gear wheel holder comprising a band adapted to be disposed concentrically of a spur gear wheel, a plurality of carriers extending outwardly from one side of the band and movably connected thereto, said carriers adapted for supporting a plurality of spur gear wheels by engaging therewith and moving the same inwardly with respect to the band and into engagement with the gear wheel disposed centrally of the band.

3. A gear wheel holder comprising a band adapted to be disposed concentrically of a spur gear wheel, a plurality of carriers extending outwardly from one side of the band and movably connected thereto, said carriers adapted for supporting a plurality of spur gear wheels by engaging therewith and moving the same inwardly with respect to the band and into engagement with the gear wheel disposed centrally of the band, and means connected to the band for securing the carriers against accidental outward movement with respect to the band.

4. A gear wheel holder comprising a band adapted to be disposed concentrically of a spur gear wheel, a plurality of carriers extending radially outward from the band including shank portions slidably connected to the band and yoke portions at one end of the shanks adapted for embracing a plurality of spur gear wheels and for supporting the same to engage with a centrally disposed gear wheel when the shanks are operated to slide inwardly with respect to the band.

5. A gear wheel holder comprising a band adapted to be disposed concentrically of a spur gear wheel, a plurality of arms carried by the band and having sleeves disposed radially of the band, a plurality of carriers having shank portions slidably fitted in said sleeves, and further having yoke portions on the inner ends of the shanks, said yokes adapted for embracing a plurality of spur gear wheels and supporting the same to engage with a centrally disposed spur gear wheel when the shanks are operated to slide inwardly with respect to the band.

Signed at New York city, in the county of New York and State of New York this 18th day of December A. D. 1926.

THOMAS K. STEVENSON.